United States Patent [19]
Torazawa et al.

[11] Patent Number: 5,997,276
[45] Date of Patent: *Dec. 7, 1999

[54] OPTICAL DISC MANUFACTURING APPARATUS

[75] Inventors: Kenji Torazawa, Ogaki; Takanari Kusafuka; Masahiro Higuchi, both of Gifu, all of Japan

[73] Assignee: Sanyo Electric Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/600,878

[22] Filed: Feb. 13, 1996

[30] Foreign Application Priority Data

Feb. 14, 1995 [JP] Japan ..................... 7-025265

[51] Int. Cl.$^6$ .................................. B29C 45/38
[52] U.S. Cl. .................... 425/566; 425/577; 425/810; 264/1.24; 264/1.33; 264/106; 369/275.3
[58] Field of Search ..................... 369/280, 282, 369/272, 275.3; 264/1.24, 1.33, 106; 425/564, 566, 810, 577, 571, 562

[56] References Cited

U.S. PATENT DOCUMENTS

| | | | |
|---|---|---|---|
| 4,391,579 | 7/1983 | Morrison | 425/548 |
| 4,394,117 | 7/1983 | Taylor | 425/549 |
| 4,405,540 | 9/1983 | Mayer | 264/106 |
| 4,802,160 | 1/1989 | Yamada et al. | 369/272 |
| 4,862,447 | 8/1989 | Opheij | 369/280 |
| 4,950,520 | 8/1990 | Imai et al. | 428/64 |
| 5,206,063 | 4/1993 | Westerhout | 369/282 |
| 5,460,763 | 10/1995 | Asai | 264/107 |

OTHER PUBLICATIONS

"Manufacturing Technique for Optical Disc" Ryoji Takashi, Kabushiki Kaisha Torikeppusu, Tokyo, Japan, Jan. 8, 1987.

*Primary Examiner*—Jan H. Silbaugh
*Assistant Examiner*—Edmund H. Lee
*Attorney, Agent, or Firm*—Armstrong, Westerman, Hattori, McLeland & Naughton

[57] ABSTRACT

A disc is provided which includes a disc body of disc shape having a center hole. An information recording area is formed on one side surface of the disc body. The information recording area has information thereon read by reflection of laser light. The information recording area has an inner circumferential edge positioned adjacent to the center hole. The disc body has a radius ranging from 39 mm to 80 mm, the center hole has a radius ranging from 7.5 mm to 7.55 mm, and the inner circumferential edge of the information recording area being positioned to extend from a radius of 15 mm to 22 mm from the center of the disc body. A disc may be manufactured by variations of the following disc manufacturing method including the steps of: supporting a stamper on a first mold by a supporting means; defining a forming space by clamping the first mold to a second mold; defining a center hole of the disc by advancing a center hole defining member into a center part of the forming space; connecting a injection means into the forming space by opening a gate member of a resin injection member and filling the forming space with a resin through a communicating hole from the injection means; and cooling the resin in the forming space after shutting off connection between the injection means and the forming space by closing the gate member of the resin injection member.

1 Claim, 18 Drawing Sheets

F I G. 14
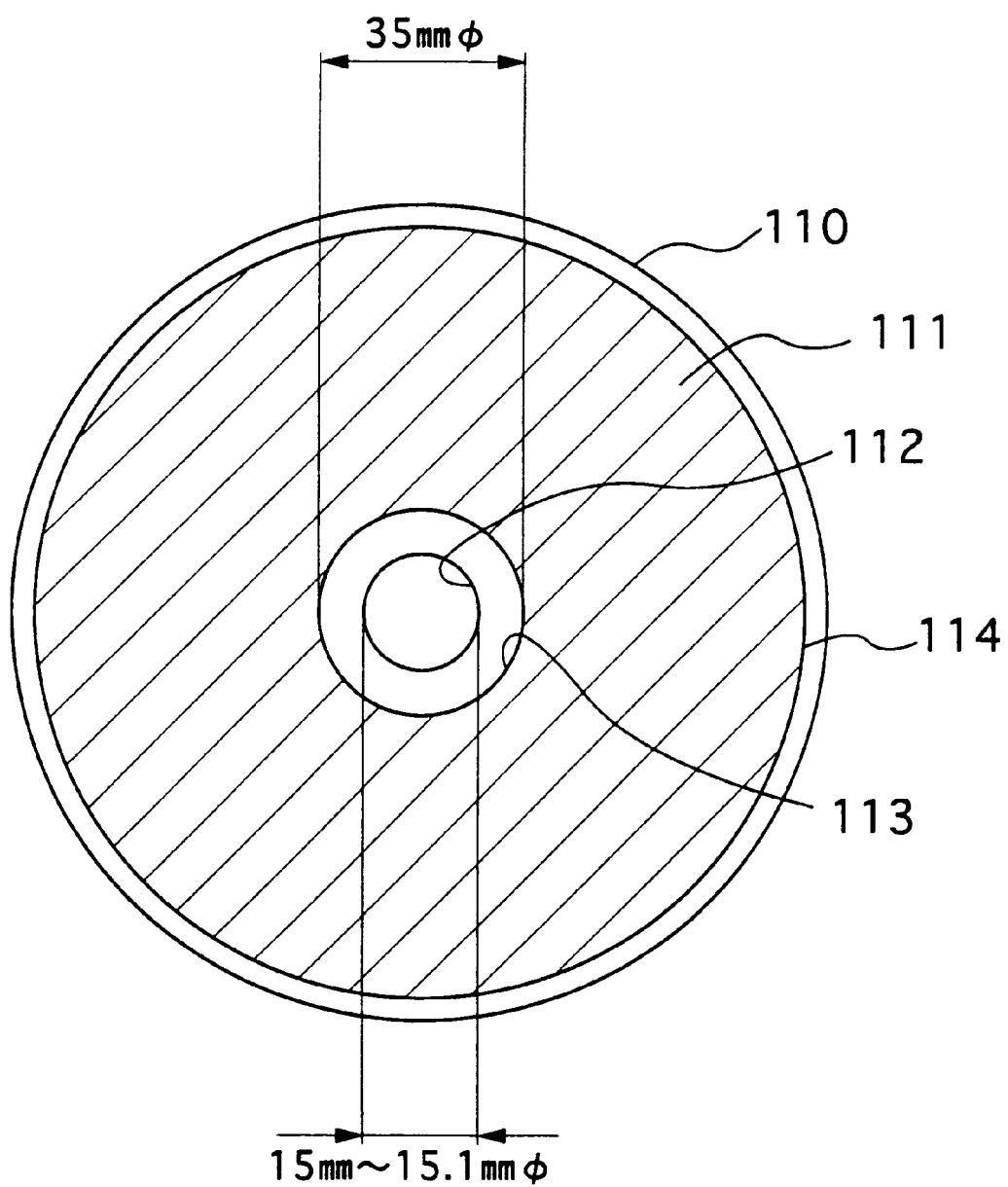

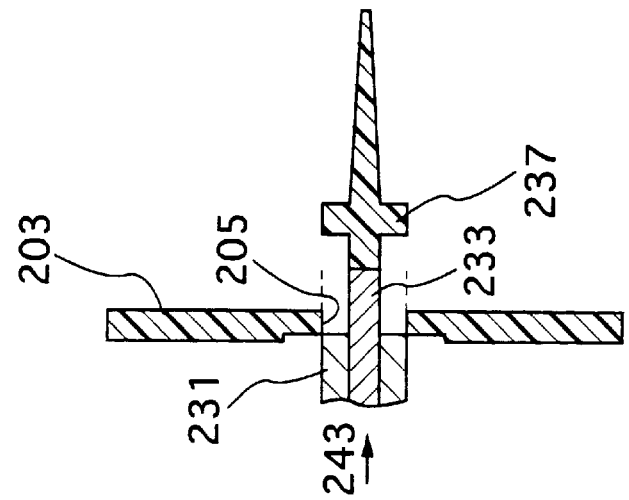
FIG.17d
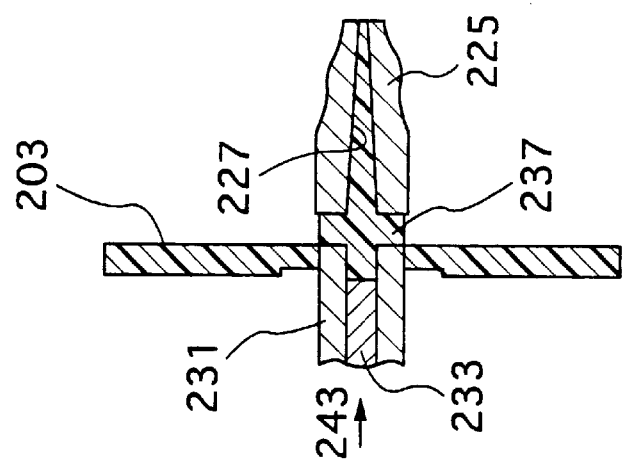
FIG.17c
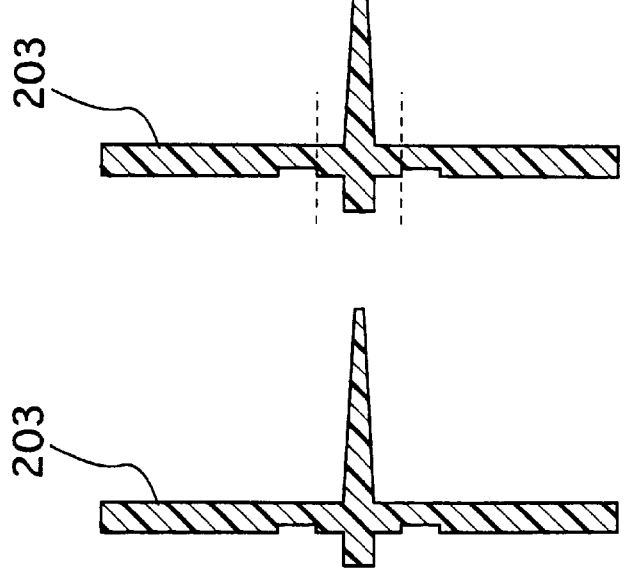
FIG.17b
FIG.17a

OPTICAL DISC MANUFACTURING APPARATUS

BACKGROUND OF THE INVENTION

1. Field of the Invention

This invention relates to a disc such as an optical disc, an optical magnetic disc, a phase change optical disc and so on having an information recording area for data near a center hole of the disc and a disc manufacturing apparatus and method thereof.

2. Description of Related Art

These days, as recording media for recording digital data such as sounds, images, pictures and computer data, an optical disc becomes the mainstream. An optical disc has various size according to recording media. For example, as the representative of a disc for sound recording media, there is a compact disc whose diameter is 120 ±0.3 mm or 80±0.3 mm, and as recording media for images and computer data and so on, there is a CD-ROM whose diameter is 120±0.3 mm.

Manufacturing apparatus for producing an optical disc of this kind is described hereafter referring to FIG. 15 to FIG. 18.

FIG. 16 shows molds and a stamper 201 for manufacturing an optical disc (a compact disc whose diameter is 120 mm). FIG. 17 shows a replica disc 203 manufactured by the molds and the stamper 201 of FIG. 16. Data are recorded on the stamper 201 from the inside diameter 46 mm to 117 mm. The replica disc 203 becomes an optical disc as a final product. A fixed mold 210 has a mirror block 211 having a mirror surface 213. The stamper 201 is fixed on the mirror surface 213 by an outer stamper holder 215 and an inner stamper holder 217. A moving mold 220 has a mirror block 221 having a mirror surface 223. The mirror block 221 contains a sprue bush 225 of pipe shape. An injection port 227 for injecting a forming material melted by heat is formed at the sprue bush 225 and its top end is exposed from the mirror surface 223.

The fixed mold 210 contains a cut pin 231 of pipe shape. A sprue ejector 233 of bar shape is disposed at the center of the cut pin 231. A top end of the sprue ejector 233 caves in a little from a top end of the cut pin 231 and forms a concave shape, so that a space 235 is provided there. The sprue bush 225, cut pin 231 and sprue ejector 233 can move in the direction of an arrow 241. The sprue bush 225, cut pin 231 and sprue ejector 233 define a center hole 205 as a through hole having an inside diameter of 15 mm to 15.1 mm on the replica disc 203, in case of a compact disc. A sprue 207 is taken out from the replica disc 203 by the sprue ejector 233.

The process to manufacture an optical disc by using the above optical disc manufacturing apparatus is described hereafter. First of all, as shown in FIG. 16, in the state that the fixed mold 210 and the moving mold 220 are opened, the stamper 201 is fixed on the mirror surface 213 of the mirror block 211 of the fixed mold 210 by the holders 215 and 217 so that a data transfer surface, as an information recording area, of the stamper 201 is outside. Then, the moving mold 220 moves toward the fixed mold 210 and both molds 210 and 220 are unified by closing them each other. Next, as shown in FIG. 15, a material melted by heat, for example, synthetic resin such as polycarbonate and so on, are injected from the injection port 227 into a disc molding space defined by the data transfer surface of the stamper 201 on the fixed mold 210 and the mirror surface 223 of the mirror block 221 of the moving mold 220. The shape of the replica disc 203 at this time is shown in FIG. 17(a). The material fill up the molding space and injection pressure of the materials at this time transfers the data recorded on the stamper 201 to a boundary surface of the material between the stamper 201 and the material. Then, the center hole 205 is formed by moving the sprue bush 225, cut pin 231 and sprue ejector 233 in the direction of an arrow 243 before the melting material cool down, as shown in 17(c). At this time, the intervals among the sprue bush 225, cut pin 231 and sprue ejector 233 are unchanged. Next, the material filling the molding space is cooled to be solidified.

Thereafter, the moving mold 220 moves to separate from the fixed mold 210 and the molds 210 and 220 are opened. At the same time, the sprue bush 225 moves to the original position in the direction of an arrow 245 so that the top of the sprue bush 225 reaches the same level as the mirror surface 223. Next, the sprue ejector 233 moves further in the direction of the arrow 243 and a sprue 237 is taken out from the replica disc 203, as shown in 17(d). The sprue 237 is the material filled at the injection port 227 and the center hole 205 at manufacturing time for a disc and it is unnecessary. After taking out the sprue 237, the cut pin 231 and the sprue ejector 233 move back to the original position in the direction of the arrow 245. By the above-described process of manufacturing optional discs, the data recorded on the stamper 201 is transferred to the replica disc 203, and such a replica disc 203 having the center hole 205 at its center is taken out. Then, an optical disc having a center hole is manufactured by providing a reflective film and the like on the information recording surface thereof.

An example of an optical disc manufactured by the above process is shown in FIG. 18.

FIG. 18 is a plan view of a compact disc manufactured by a common injection mold method.

As shown in FIG. 18, a mold used for mass production bores a center hole 252, whose inside diameter is from 15 mm to 15.1 mm (in case of a compact disc) prescribed by International Electrotechnique Commission (IEC), through an information recording area 251, shown by cross-hatching, of an optical disc body 250 during manufacturing process. A recording start point 253 of the information recording area is at an inside diameter of 46 mm.

In the above disc manufacturing apparatus, boring operation for the center hole is performed during the disc molding process, so that manufacturing steps increases. In addition, the material filled in a center part of a disc, namely, a sprue part, are wasteful. Moreover, compaction of a disc is demanded as amount of information is expanded due to diversification of multi-media. That is, a disc whose diameter or size is made smaller than the present one will be needed. As an example of a compact disc on the market, a layout on a plane of a well-known compact disc shown in FIG. 18 is as follows:

the outside diameter=120 mm the largest diameter of the information recording area (recording end point)=117 mm the smallest diameter of the information recording area (recording start point)=46 mm center hole (through hole)=15 mm Here, though the outside diameter of a disc is 120 mm, the largest diameter of the information recording area, namely, the position of a lead-out 254 (recording end point) is 117 mm, and the smallest diameter of the information recording area, namely, the position of a lead-in 253 (recording start point) is 46 mm. Therefore, only 80 percent of the whole disc area is used as an information recording area. In addition, in case of a compact disc and a minidisc which have a smaller diameter, the utility as an information recording area is lowered further.

SUMMARY OF THE INVENTION

In view of the above, an object of the invention is to decrease the number of steps for manufacturing a disc, to avoid waste of material and to manufacture a disc having a larger recording capacity by recording data up to a center part of the disc where data was not recorded conventionally.

A disc manufacturing apparatus in one mode of the present invention is composed of a first mold for supporting a stamper; a second mold facing said first mold for defining a molding space for a disc with said first mold; and a resin injection means, supported by said second mold, for defining a center hole of a disc when a top end thereof contacts at least one of said stamper or said first mold, and providing a resin injection gate facing said center hole.

A disc in one mode of the present invention has a disc body of disc shape having a center hole. An information recording area, whose information can be read by reflecting a laser thereon, is formed on one side surface of the disc body. The inner circumferential edge of the information recording area is positioned adjacent to the center hole.

An optical disc in another mode of the present invention has a disc body of disc shape whose radius is 39 mm to 80 mm, and the disc body has a center hole whose radius is 7.5 mm to 7.55 mm. An information recording area, whose information can be read by reflecting a laser thereon, is formed on one side surface of the disc body. The inner circumferential edge of the information recording area is positioned within an extent from a radius of 15 mm to 22 mm from a center of the disc body.

A disc manufacturing apparatus in another mode of the present invention is comprised of a first mold having a supporting means for supporting a stamper at a fixed point; a second mold relatively clamped to said first mold by relatively moving towards said first mold so as to define a forming space of disc shape in cooperation with a data transferred surface of said stamper supported by said first mold; an injection means, provided on said second mold, for injecting a resin; a resin injection means having a communicating hole extended towards a center of said forming space inside said second mold so as to connect said injection means and said forming space, and having a gate means for opening and closing a connecting point between said communicating hole and said forming space; and a center hole defining means, provided on said resin injection means so as to be movable forward and backward to a center part of said forming space, for defining a center hole of a disc when advanced into said forming space.

Moreover, an optical disc manufacturing apparatus in another mode of the present invention forms a replica disc by an injection mold method by use of a stamper having a data transfer surface on its one side. This apparatus comprises a first mold having a mirror surface for supporting the other side surface of said stamper, a positioning means for positioning said stamper at a fixed position on said mirror surface, and a supporting means for sucking and supporting the other side surface of said stamper on said mirror surface; and a second mold having a mirror surface facing said mirror surface of said first mold. Said first mold and said second mold move relatively to be closed with each other so that a forming space of disc shape is defined between a data transfer surface of said stamper supported on said mirror surface of said first mold and said mirror surface of said second mold. The apparatus further comprises an injection means provided on said second mold and for injecting a resin; a valve member contained in said second mold, having a supporting bar of a fixed diameter extended towards a center of said forming space and a valve body formed at a top end of said supporting bar so as to extend radially, a top end surface of said valve body touching closely a center part of said stamper when said first mold and said second mold are closed to each other; and a guide tube contained in said second mold, covering an outer circumference of said supporting bar of said valve member and having a fixed diameter extended towards a center of said forming space. A communicating hole, connecting to said injection means, is defined between an outer circumferential surface of said supporting bar and an inner circumferential surface of said guide tube. Said valve body and a top end of said guide tube constitutes said gate means while said guide tube can freely reciprocate in a direction of its axis between a separating position where its top end separates from said valve body of said valve member and a contacting position where its top end contacts said valve body. Said communicating hole is connected to said forming space when said guide tube is at said separating position while said communicating hole is shut off from said forming space when said guide tube is at said contacting position. At least said top end of said guide tube defines a center hole of a disc at a center part of said forming space at said contacting position.

Other objects and profits will be clear by referring to the following description with accompanying drawings showing a preferred embodiment in detail.

BRIEF DESCRIPTION OF THE DRAWINGS

FIG. 14 is a plan view showing an optical disc, manufactured by a disc manufacturing method according to the first embodiment of the present invention, provided with a center hole at its center and having an information recording area even near the center hole.

FIG. 17(a)~FIG. 17(d) are explanatory views showing a molding process of a disc in related art.

DESCRIPTION OF THE PREFERRED EMBODIMENT

A first embodiment of a disc manufacturing apparatus of the present invention is described hereafter.

Figure 1:
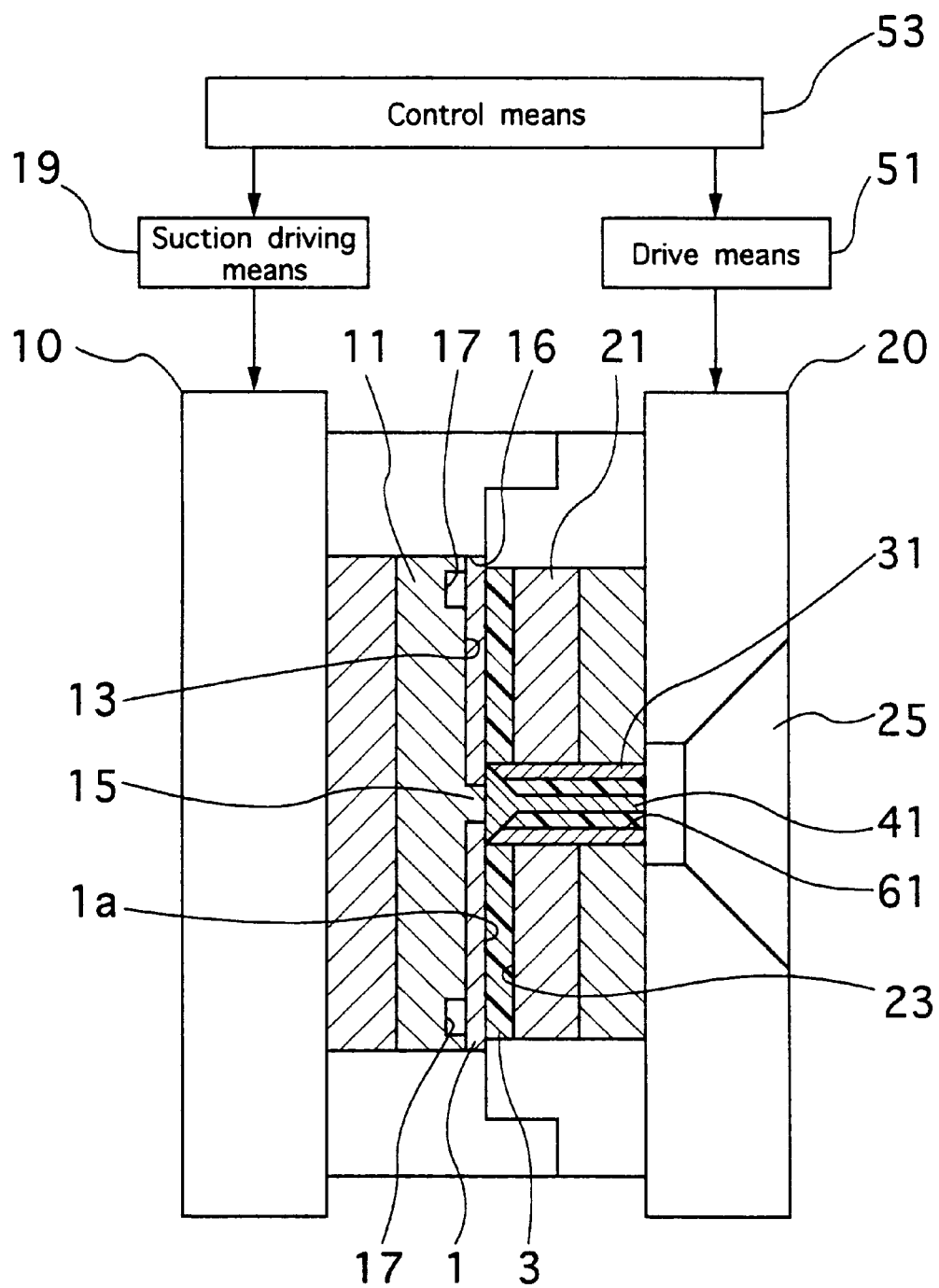
FIG. 1 is a sectional view of an entire structure of a disc manufacturing apparatus of a first embodiment of the present invention, showing a state of cooling an injected resin.
Figure 2:
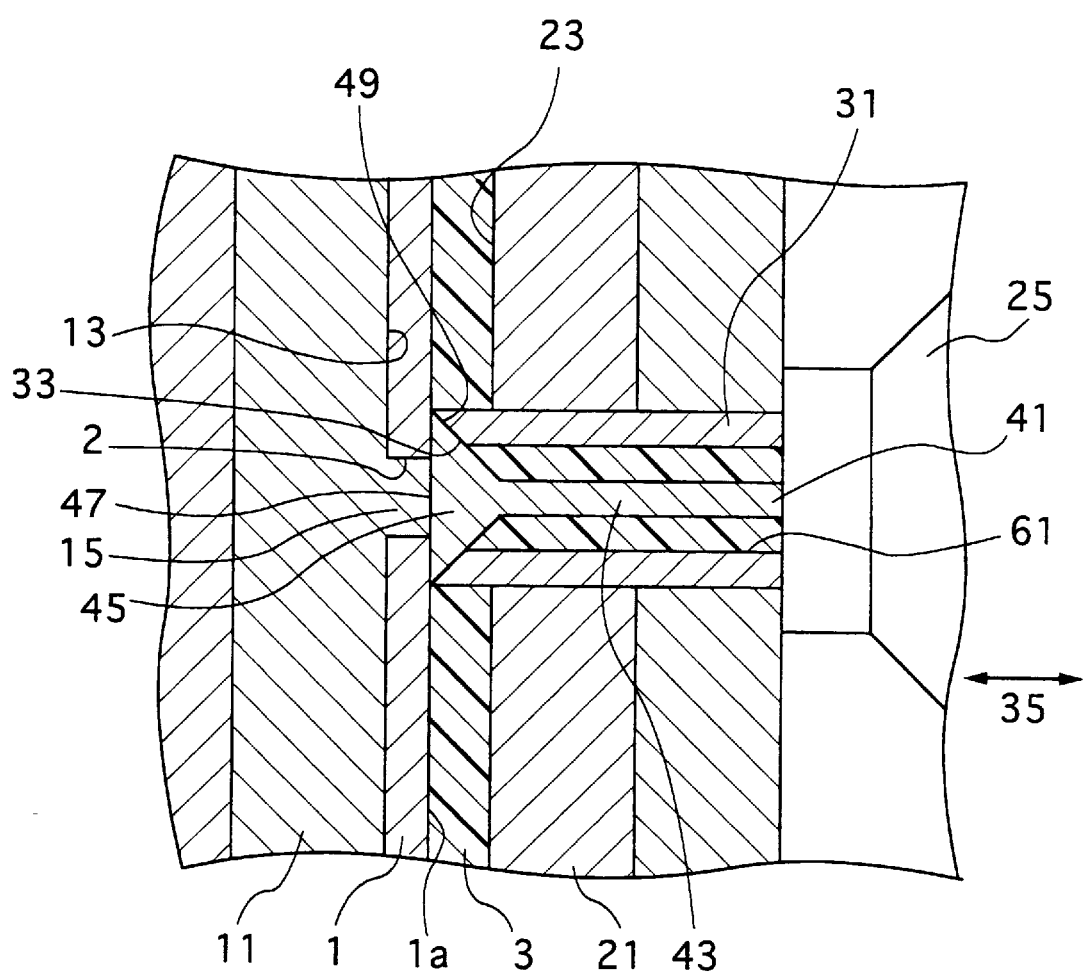
FIG. 2 is a sectional view showing main parts of the disc manufacturing apparatus of FIG. 1.
Figure 3:
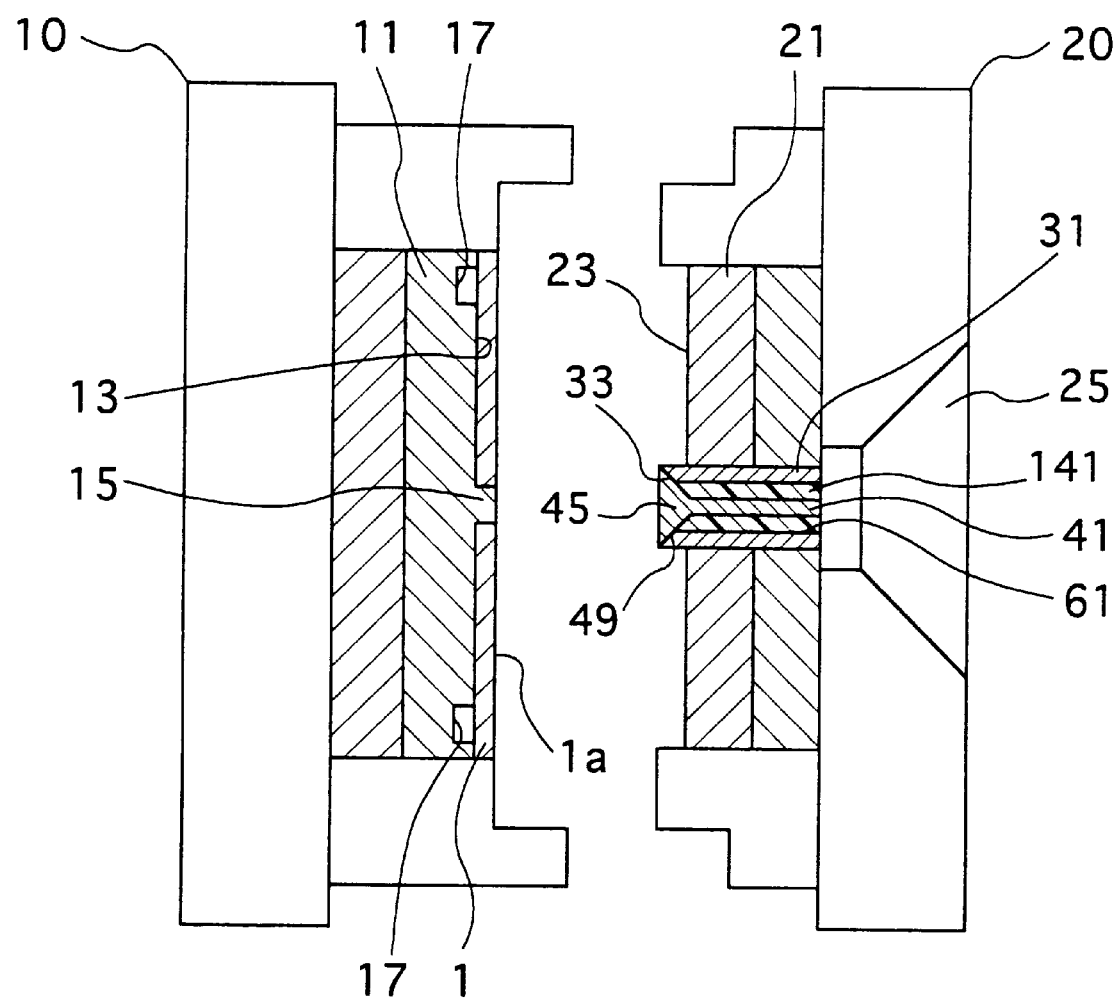
FIG. 3 is a sectional view showing a state in which a moving part and a fixed part of a mold are opened in a process for molding a disc by the disc manufacturing apparatus of the first embodiment.
Figure 4:
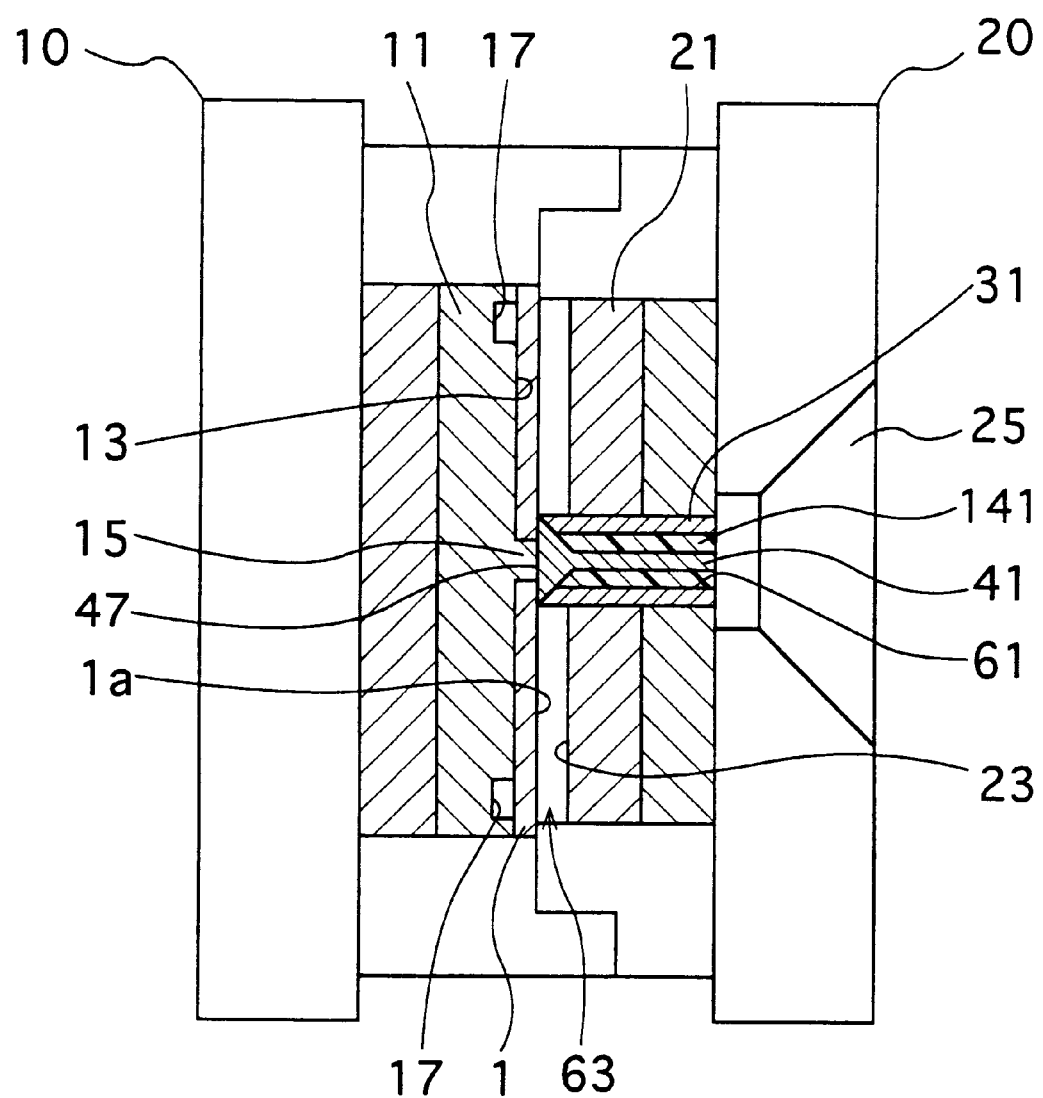
FIG. 4 is a sectional view showing a state in which the moving and fixed part of the mold are closed in the process for molding the disc by the disc manufacturing apparatus of the first embodiment.
Figure 5:
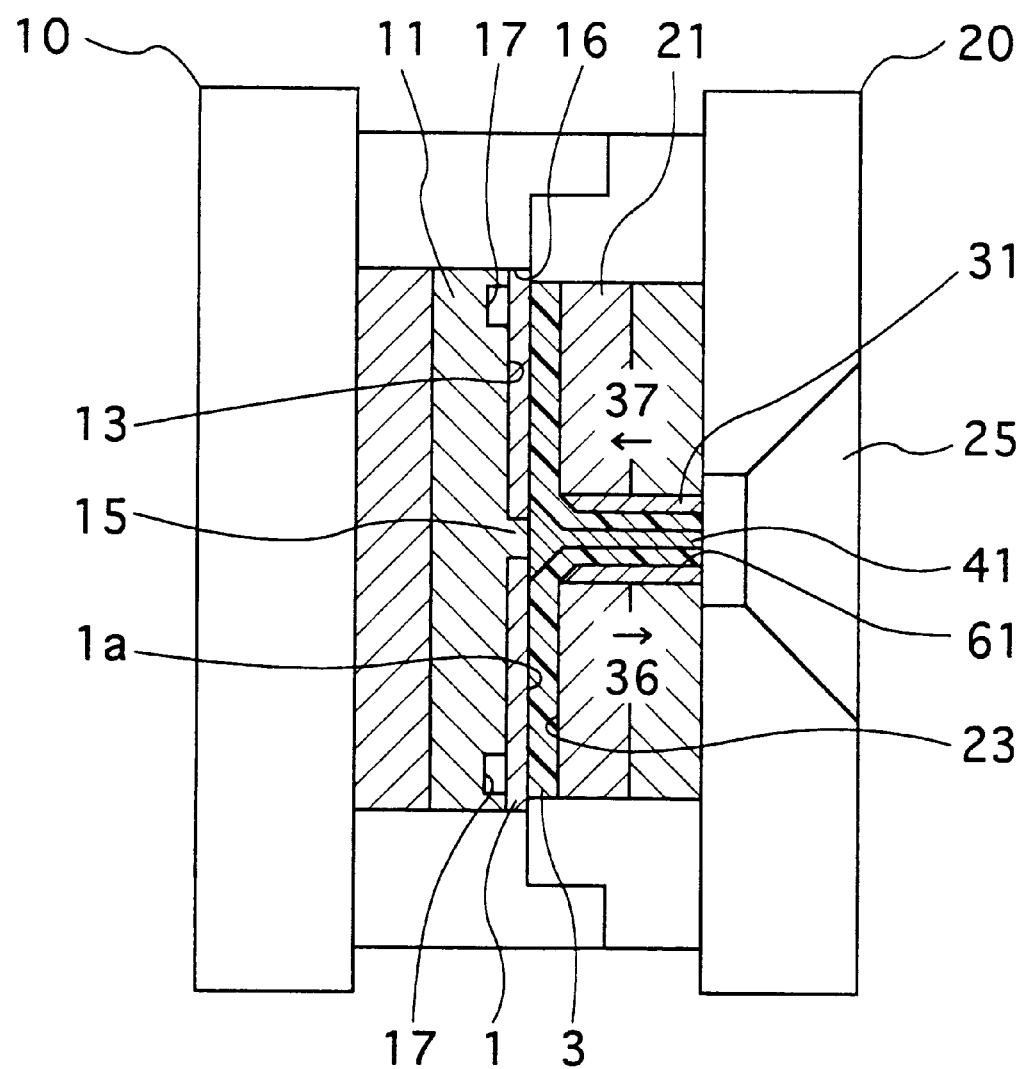
FIG. 5 is a sectional view showing a state in which a resin is injected in the process for molding the disc by the disc manufacturing apparatus of the first embodiment.
Figure 6:
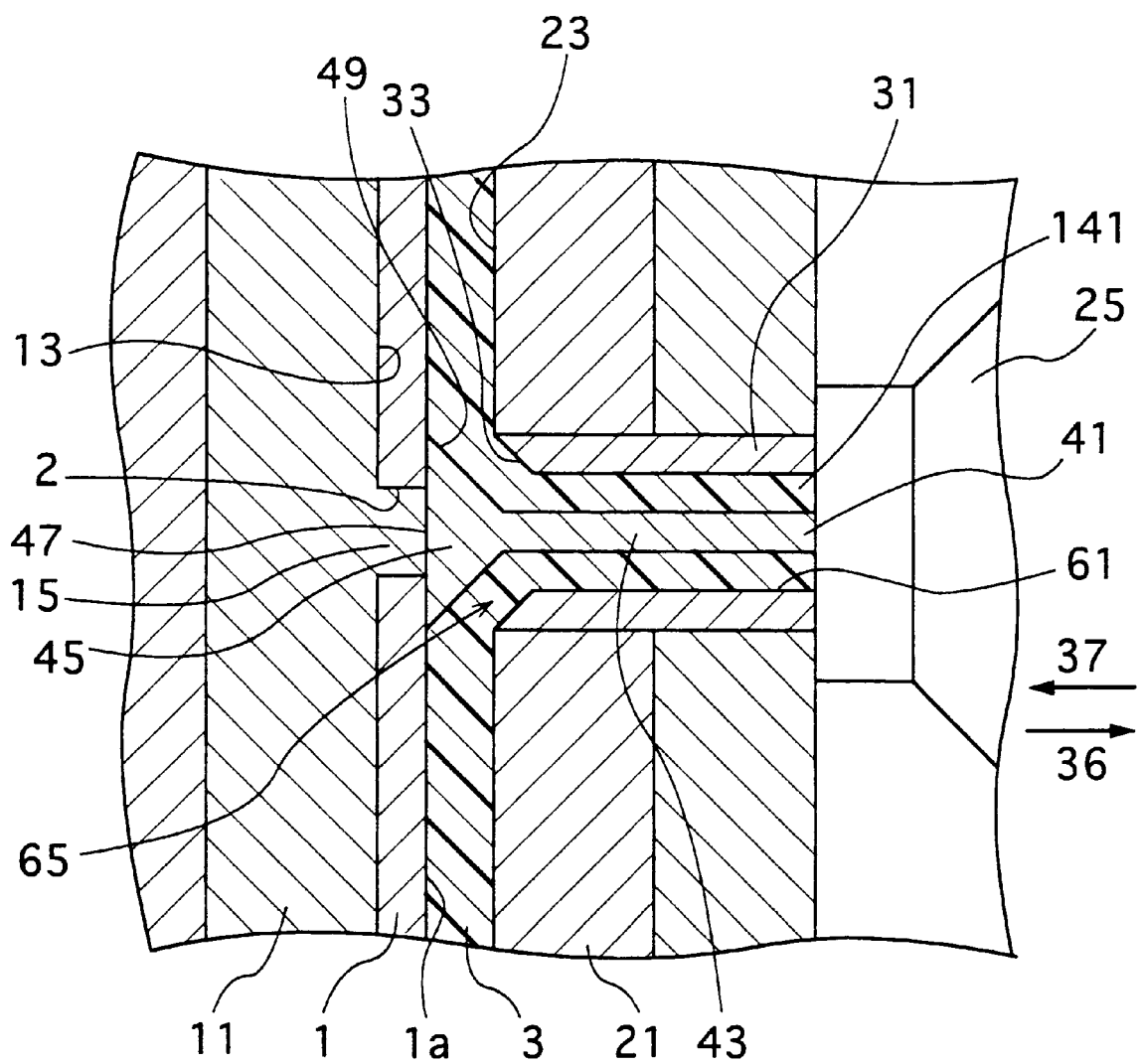
FIG. 6 is a sectional view showing main parts of the disc manufacturing apparatus of FIG. 5.
Figure 7:
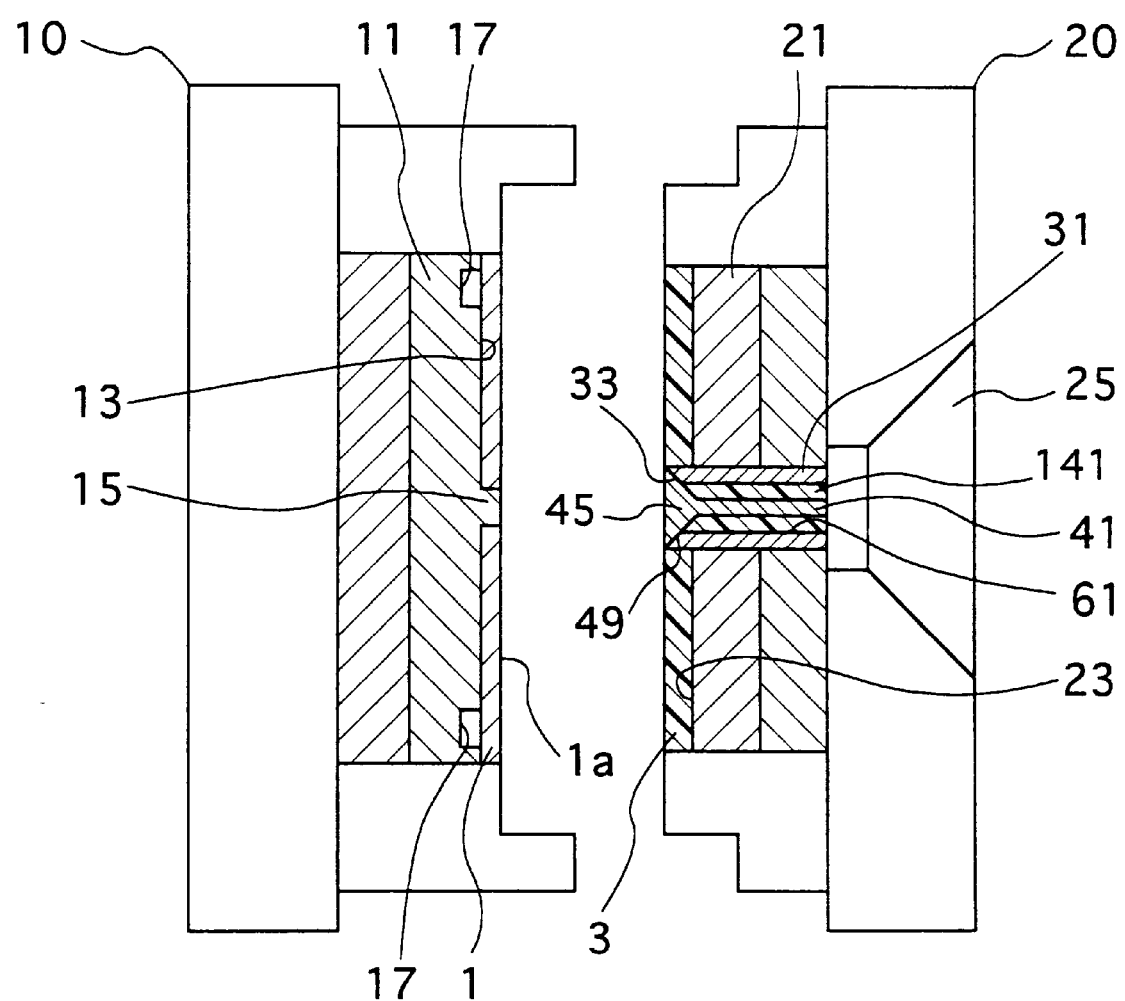
FIG. 7 is a sectional view showing a state in which the moving and fixed parts of the mold are opened after injecting the resin in the process for molding the disc by the disc manufacturing apparatus of the first embodiment.
Figure 8:
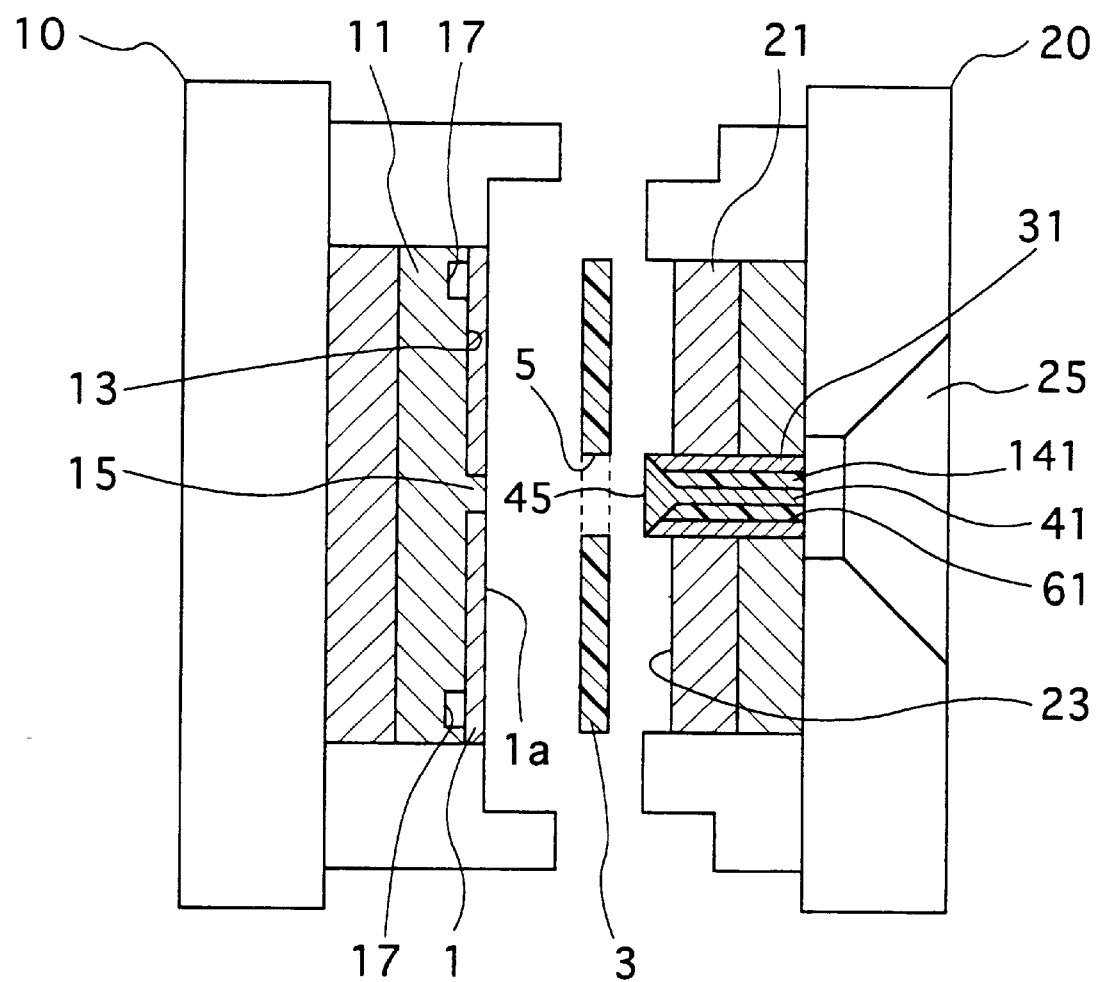
FIG. 8 is a sectional view showing a state in which a replica disc is taken out in the process for molding the disc by the disc manufacturing apparatus of the first embodiment.

FIG. 1 is a sectional view of an entire structure of a disc manufacturing apparatus of the first embodiment of the present invention, showing a state of cooling an injected resin. FIG. 2 is a sectional view showing main parts of the disc manufacturing apparatus of FIG. 1. FIG. 3 to FIG. 8 show a process for molding a disc by using the disc manufacturing apparatus of the first embodiment. FIG. 3 is a sectional view showing a state in which a moving part and a fixed part of a mold are opened. FIG. 4 is a sectional view showing a state in which the moving and fixed molds are closed. FIG. 5 is a sectional view showing a state in which a resin is injected. FIG. 6 is a sectional view showing the main parts of the disc manufacturing apparatus of FIG. 5. FIG. 7 is a sectional view showing a state in which the moving and fixed parts of the mold are opened after injecting a resin. FIG. 8 is a sectional view showing a state in which a replica disc is taken out.

In FIG. 1, the disc manufacturing apparatus in the present embodiment forms a replica disc 3, which is made into an optical disc as a final product, by injection mold method by using a stamper 1. The stamper 1 has a data transfer surface 1a on its one side surface where data is recorded even near a center hole. The disc manufacturing apparatus has an injection mold for the injection mold method, which is composed of a moving part 10 as a first mold and a fixed part 20 as a second mold. The moving part 10 has a moving mirror block 11 having a mirror surface 13 for fixing the stamper 1. A positioning protrusion 15 as a positioning means to position a center of the stamper 1 is formed integrally on a center of the mirror surface 13. A plurality of suction ports 17 are formed near an outer circumference of the mirror surface 13. They are connected to a suction driving means 19 like a vacuum pump and so on. The suction driving means 19 and the suction port 17 constitute a supporting means to support the stamper 1 of the present invention at a fixed position on the mirror surface 13 by sucking and fixing it. As the positioning means, not only the positioning protrusion 15 but a regulating surface 16 located at the outer circumference of the mirror surface 13 of the moving mold 10 regulate the movement of the stamper 1 by contacting an outer circumference of the stamper 1 and position it at the fixed point. Therefore, it is possible to adopt only the regulating surface 16 as a positioning means and to omit the positioning protrusion 15. In addition, it is also possible to have such a constitution as to support the stamper 1 at the fixed position by suction supporting of the suction port 17 without additionally providing a positioning means.

A fixed mold 20 has a fixed mirror block 21 having a mirror surface 23 which faces the mirror surface 13 of the moving mold 10. The moving mold 10 is moved towards the fixed mold 20 by a mold clamping device not shown so as to close both the moving and fixed parts of the mold. Then, a disc forming space 63 of disc shape corresponding to the replica disc 3 is defined between the one side surface of the stamper 1 supported by the mirror surface 13 of the moving mold 10 and the mirror surface 23 of the fixed mold 20. A connecting part 25 containing a nozzle not shown is provided on the fixed part 20. The nozzle is connected to an injection device not shown and it constitutes an injection means with the injection device. In addition, the fixed part 20 accommodates a resin injection means therein. The resin injection means injects a resin 25 into the forming space 63 through the connecting part from the injection device, thereby filling the forming space 63 with the resin.

As shown in FIG. 1, the resin injection means is composed of a guide tube 31 as a tube body and a valve member 41 contained in the guide tube 31 as a resin injection valve. The guide tube 31 extends from the connecting part 25 towards a center part of the forming space 63 through the inside of the fixed part 20. The guide tube 31 has a cylindrical tube shape of a fixed diameter so as to cover the valve member 41 at a fixed interval. A top end of the guide tube 31 is a valve seat surface 33 of tapered shape which slants inwardly, as shown in FIG. 2. The valve member 41 is composed of a supporting bar 43 of cylindrical rod shape extended along the axis of the guide pipe 31 and a valve body 45 of cone shape formed integrally at the top end of the supporting bar 43 so as to extend radially from the supporting bar 43. A top end surface, as one side surface, of the valve body 45 is a flat surface 47 of round shape having a larger diameter than that of the positioning protrusion 15 of the moving mold 10. The flat surface 47 touches closely the center part of one side of the stamper 1 fixed on the mirror surface 13 in a sealed condition when both the moving part 10 and fixed part 20 are closed. A base end of the supporting bar 43 of the valve member 41 is secured to the fixed mold 20. The top end of the valve member 41 has a fixed length corresponding to the distance between the data transfer surface 1a of the stamper 1 and the mirror surface 23. Namely, it has the same length as the thickness of the disc forming space 63 while protruding from the mirror surface 23. By these mechanism, the flat surface 47 of the valve body 45 touches closely the center part of the one side surface of the stamper 1 at the closing time of the mold. In addition, it is possible to adopt such a constitution that the valve part 41 has a little longer length than the above fixed length, and that a damper mechanism is provided on the base end side of the valve member 41. In this case, the valve member 41 is protruded and retracted elastically in the direction of its axis and the flat surface 47 touches closely and elastically the center part of the one side surface of the stamper 1 at the mold closing time. Moreover, in the illustrated example, the diameter of the flat surface 47 is set to cover an outer peripheral part around the center hole 2 of the stamper 1, in addition to the positioning protrusion 15. However, it is enough for the diameter of the flat surface 47 to be set so as to cover at least the positioning protrusion 15 or the whole center hole 2 as long as the diameter stands the inside of the data transfer surface 1a.

A slanting surface, as the other side surface, of the valve body 45 is a sealing surface 49 to closely and planarly touch the valve seat surface 33 of the guide tube 31 in a sealed state. Then, as shown by an arrow 35 in FIG. 2, the guide tube 31 can reciprocate between a contacting point (FIG. 2) where the valve seat surface 33 contacts the sealing surface 49 of the valve member 41 and a separating point (FIG. 6) where the valve sear surface 33 separates from the sealing surface 49 in the direction of its axis by means of a drive means 51. In addition, the diameter of the valve body 45 is set to be the same as the outside diameter of the guide tube 31 and an outer circumference edge of the valve seat surface 33 meets with the outer circumference edge of the sealing surface 49 at the contacting position. Thus, the guide tube 31 and the valve member 41 are unified at the contacting position so as to define a cylindrical tube which has its top end blocked with the same diameter as that of the guide tube 31. A communicating hole 61 for communicating the injection means and the forming space is defined between the internal circumferential surface of the guide tube 31 and the outer circumferential surface of the valve member 41. The valve body 45 of the valve member 41 and the valve seat, surface 33 of the top of the guide tube 31 constitute a resin injection gate 65 or a gate means to open and close a top end of the communicating hole 61, which is a connecting point thereof to the forming space 63. Thus, a material 141 melted by heat is led to the gate 65 as a resin injection means through the communicating hole 61. Here, the distance between the internal circumferential surface of the guide tube 31 and the outer circumferential surface of the supporting bar 43 is about 1mm and the thickness of the communicating hole 61 is also about 1 mm.

Moreover, the top end of the resin injection means constitutes a center hole defining means to define a center hole 5 of the replica disc 3. Specifically, such means is defined by the outer circumferential surface of the top end of the guide tube 31, which contacts the valve body 45 when advanced into the center part of the forming space 63 at the mold closing time. Here, the inside diameter of the center hole 5 of the replica disc 3 is from 15 mm to 15.1 mm in case of a compact disc, and the outside diameter of the guide tube 31 is also from 15 mm to 15.1 mm, accordingly.

The suction driving means 19 and the drive means 51 are connected to a control means 53, and their operations are controlled under a program which is previously stored therein.

In the present embodiment, the valve body 45 is formed into a solid cone shape and has the flat surface 47 of its top end contact planarly with the stamper 1 or the positioning protrusion 15. However, it is also possible to adopt a valve body 45 of a hollow cone shape and make its top portion concave of triangular pyramid shape, so as to have its top end edge of round shape contact linearly with the stamper 1 or the positioning protrusion 15.

Next, a process for manufacturing a replica disc, for making an optical disc, of the first embodiment of the present invention is described hereafter. The following process is executed according to a control program of a control means provided in an injection molding apparatus to which the present embodiment of the apparatus can be applied to, and a control program of the control means 53.

First of all, while the moving part 10 and the fixed part 20 are opened (FIG. 3), the stamper 1 is positioned at a fixed position on the mirror surface 13 by inserting the positioning protrusion 15 into the center hole 2 of the stamper 1. Next, the stamper 1 is fixed on the mirror surface 13 of the moving mirror block 11 by sucking and supporting the other side surface of the stamper 1 by means of the effect of a vacuum pump and so on through the suction port 17 by driving the suction driving means 19 so that the information recording area of the data transfer surface 1a is outside (FIG. 2). Then, the moving part 10 moves towards the fixed part 20 by the mold clamping device, and they are unified by being closely contacted with each other (FIG. 4). At this time, the flat surface 47 of the valve member 41 planarly touches the center part of the stamper 1 or the positioning protrusion 15. Then, as shown in FIG. 5 and FIG. 6, the drive means 51 moves the guide tube 31 in the direction of an arrow 36 toward a separating position to the valve body 45. At this time, the top end of the guide tube 31 is at such a position as does not protrude from the mirror surface 23, namely at a level plane of the mirror surface 23.

After that, the material 141 melted by heat, for example, a melting synthetic resin like polycarbonate and so on, is injected into the communicating hole 61 through the connecting part 25 from the injection device. Then, the melted resin 141 is injected into the disc forming space 63 through the communicating hole 61 from the gate 65 as a resin injection means (FIG. 5 and FIG. 6). Thereafter, the material 141 fills the forming space 63 defined between the data transfer surface 1a of the stamper 1 and the mirror surface 23. The data recorded on the stamper 1 is transferred to a boundary surface of the resin, which is formed between the stamper 1 and the material 141, by the injection pressure of the material 141. At this time, the material 141 flows through the communicating hole 63 in the direction perpendicular to plane direction of the forming space 63. Then, it flows along the inclined or tapered sealing surface 49 of the valve body 45, thereby changing its flowing or advancing direction to the plane direction of the forming space 63. Therefore, the melting resin 141 flows in the forming space 63 smoothly and spreads over to every corner of the molding space 63 at uniform pressure. In addition, the valve seat surface 33 facing to the sealing surface 49 is also inclined so as to be parallel to the sealing surface 49. As a result, the flowing course of the melting resin 141 is changed from the communicating hole 61 to the forming space 63 at the gate 65 extending in the slant direction, so that its flowing becomes smooth.

Then, the guide tube 31 moves in the direction of an arrow 37 so that the valve seat surface 33 of the guide tube 31 is contacted with the sealing surface 49 of the valve member 41, before the melting material 141 injected from the communicating hole 61 and the resin injection gate 65 is cooled down. At this time, the top end edge of the guide tube 31 also contacts with the stamper 1 and the resin injection gate 65 is closed (FIG. 1). Next, the material 141 filling the forming space 63 is cooled and solidified. After that, as shown in FIG. 7, the moving part 10 is moved to separate from the fixed part 20 and the mold is opened. Then, as shown in FIG. 8, the replica disc 3 having data transferred from the stamper 1 and having the center hole 5 at its center is taken out from the mirror surface 23 of the fixed mold 20. This replica disc 3 is manufactured into an optical disc as a final product after a reflective film and an overcoat and so on are provided thereto.

In an optical disc manufacturing method using the above optical disc manufacturing apparatus, the guide tube 31 functions as a center hole defining means to define the center hole 5 of the replica disc 3 by its outer circumferential surface of the top end portion at the time when the material 141 is cooled. Then, when the mold is opened, the guide tube 31 is extracted from the replica disc 3 and the center hole 5 is formed there. Therefore, boring operation for a center hole required in related art is not necessary. As a result, making steps therefor is simplified and productivity is increased. In addition, a part corresponding to a sprue in related art, namely, the material 141 in the communicating hole 61 is retained in the guide tube 31 while maintains its melting condition, and is used in a next manufacturing work. Therefore, it is not necessary to remove the material 141 at a sprue 1 which is cooled and solidified, contrary to the related art. Accordingly, the yield of material is improved and no special operation therefor is unnecessary. In addition, productive cost is reduced and productivity is increased much more. Furthermore, the other side surface of the stamper 1 is sucked and fixed on the mirror surface 13 by the suction driving means 19 and the suction port 17, so that there is no stamper supporting means as in the related art at one side surface or the data transfer surface 1a of the stamper 1, and the data transfer surface 1a can be formed up to a desired area. As a result, the data transfer surface 1a can be provided to even near the center hole 2 of the stamper 1 and the information recording area transferred to the replica disc 3 can be wider. In addition, it is possible to fill the forming space 63 with the melting material 141 and cool and solidify the material 141 only by such a simple operation as the guide tube 31 moves between the separating position and the contacting position in relation to the valve member 41. As a result, the whole constitution of the apparatus becomes compact and inspection and maintenance for it become easy. In addition, the resin injection gate 65 is positioned so as to face the center of the stamper 1, so that the injection pressure of the material 141 is dispersed to the whole stamper 1 and specific vector does not become large. As a result, the stamper 1 does not move in the molding space 63 and therefore, certain and smooth injection molding is practicable.

In the first embodiment, regarding the structure of the parts around the resin injection gate 65, the valve body 45 is formed into a cone shape, the valve seat surface 33 is formed slant so as to planarly touch the sealing surface 49 and is able to separate from it. However, it is possible for the resin injection means in the present invention only to have a tubular shape for defining the center hole 5 of the replica disc 3, form the communicating hole 61 and have a mechanism corresponding to the resin injection gate 65. For example, it is possible to concretize the resin injection means as shown in the following modifications.

Modified embodiments of a disc manufacturing apparatus of the present invention is described hereafter.

Figure 9:
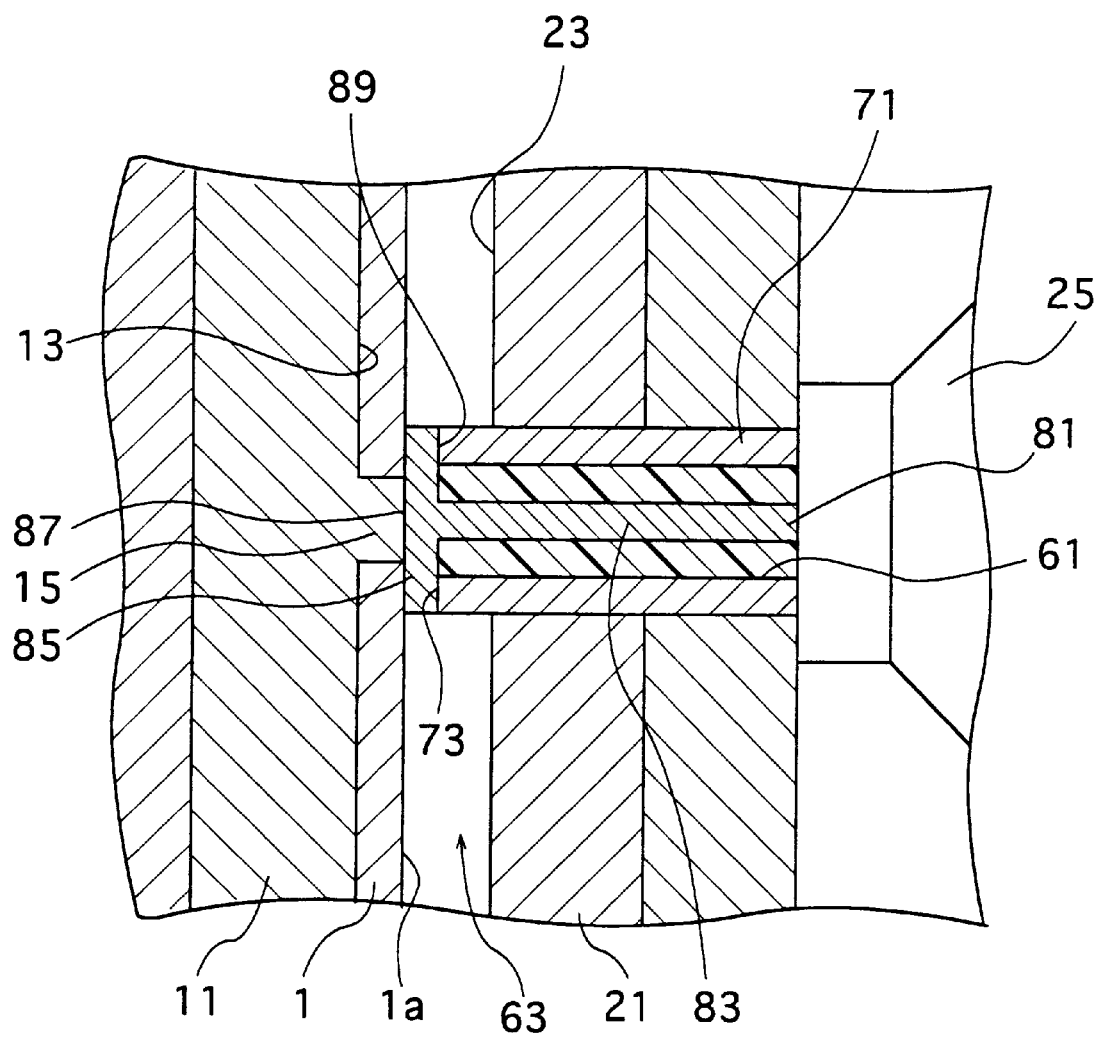
FIG. 9 is a sectional view of main parts of a mold for a disc manufacturing apparatus of a second embodiment of the present invention, showing a state after closing the mold and before injecting a resin.
Figure 10:
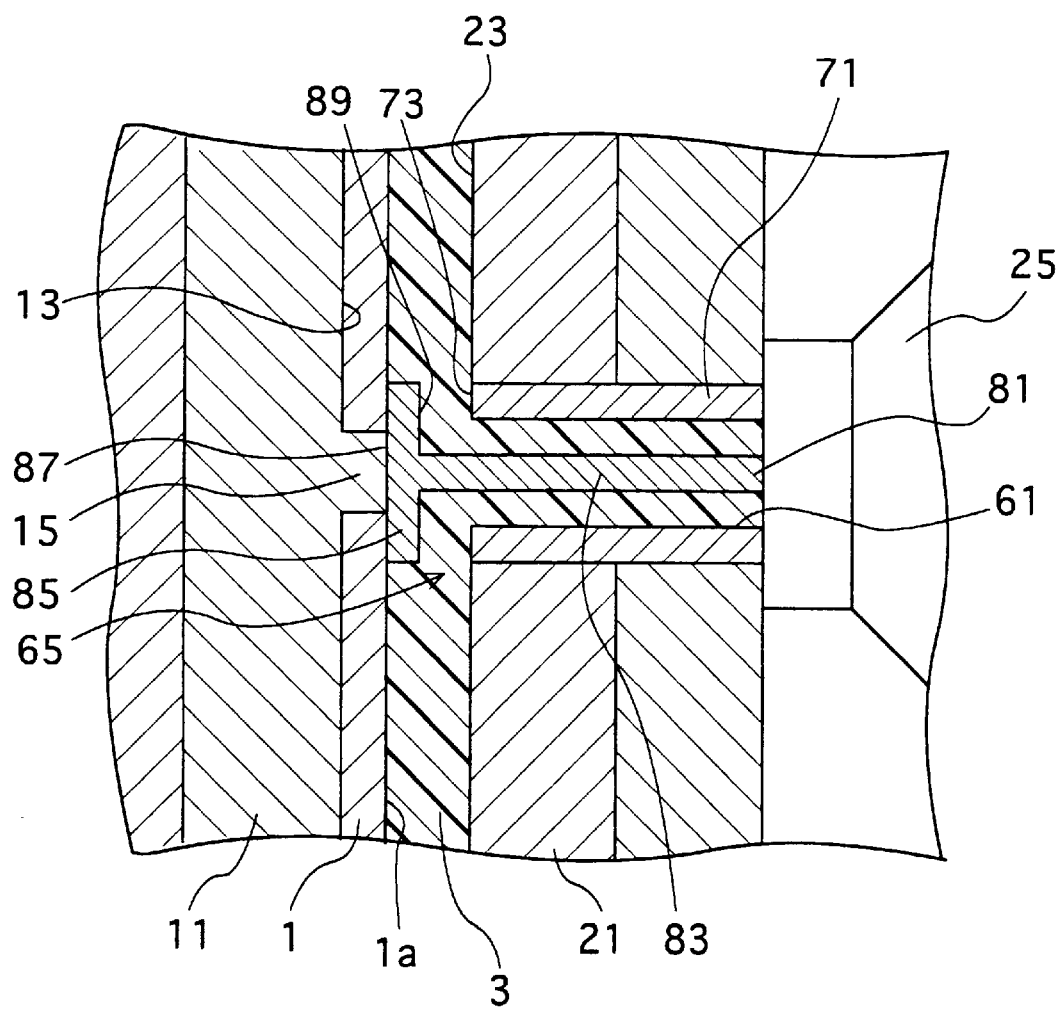
FIG. 10 is a sectional view of the main parts of the mold for the disc manufacturing apparatus of the second embodiment of the present invention, showing a state in which the resin is injected.

FIG. 9 is a sectional view showing main parts of a mold for a disc manufacturing apparatus in a second embodiment of the present invention and shows the state after closing molds and before injecting resin. FIG. 10 is a sectional view showing the main parts of the mold for the disc manufacturing apparatus in the second embodiment of the present invention and shows the state in which the resin is injected.

As shown in FIG. 9 and FIG. 10, the second embodiment is different from the above embodiment in the shape of top end portion of a guide tube 71 and top end portion of a valve member 81 which constitute a resin injection means. Namely, the top end of the guide tube 71 is not inclined inwardly, but is made into a valve seat surface 73 of flat shape which extends radially. The valve member 81 is composed of a supporting bar 83 of cylindrical rod shape and a valve body 85 formed integrally on the top end of the supporting bar 83. The valve body 85 is a disc shape whose diameter is the same as the outside diameter of the guide tube 71. A top end surface, as one side surface, of the valve body 85 is a flat surface 87 of round shape which has a larger diameter than that of the positioning protrusion 15 of the moving part 10. It touches closely and sealingly the center part of one side surface of the stamper 1 at the mold closing time.

A flat surface, as the other side surface, of the valve body 85 which extends radially is made into a sealing surface 89 which touches closely and planarly the valve bearing surface 73 in a sealed state. The guide tube 71 can reciprocate between a contacting position (FIG. 9) where the valve seat surface 73 contacts the sealing surface 89 and a separating point (FIG. 10) where the valve seat surface 73 separates from the sealing surface 89 in the direction of its axis by means of a driving means 51. In addition, the diameter of the valve body 85 is set to be the same as the outside diameter of the guide tube 71, so that the outer circumferential edge of the valve seat surface 73 meets with the outer circumferential edge of the sealing surface 89 at the contacting position. Thus, the guide tube 71 and the valve member 81 are unified at the contacting position, thereby integrally defining a cylindrical tubular shape whose top end is blocked and has the same diameter as that of the guide tube 71. The valve body 85 of the valve member 81 constitutes a resin injection gate 65 or a gate means, as a connecting point to the forming space 63 of the communicating hole 61, thereby to open and close a top end of the communicating hole 61.

Moreover, the top end of the resin injection means constitutes a center hole defining means to define a center hole 5 of a replica disc 3. Specifically, the center hole defining means is defined by the outer circumferential surface of the valve body 85 and the outer circumferential surface of the top end of the guide tube 71, which contacts the valve body 85 after advancing into the center part of the forming space 63 at the mold closing time.

In the second embodiment, the replica disc 3 can be also manufactured by the same manufacturing process as that of the first embodiment. Here, the top end of the guide tube 71 is formed into a flat surface extended radially, so that it does not need a special processing like a taper processing. Thus, the guide tube 71 can be a simple cylindrical shape. The valve body 85 also does not need such a special processing as its sealing surface is formed into a cone shape or tapered shape, and it can be a simple disc shape. As a result, the cost of the guide tube 71 and the valve member 81 is reduced and the cost of the whole apparatus can be also reduced. Moreover, it is possible to make it easy to make the outer circumference surfaces of the guide tube 71 and the valve body 85 level to each other.

Figure 11:
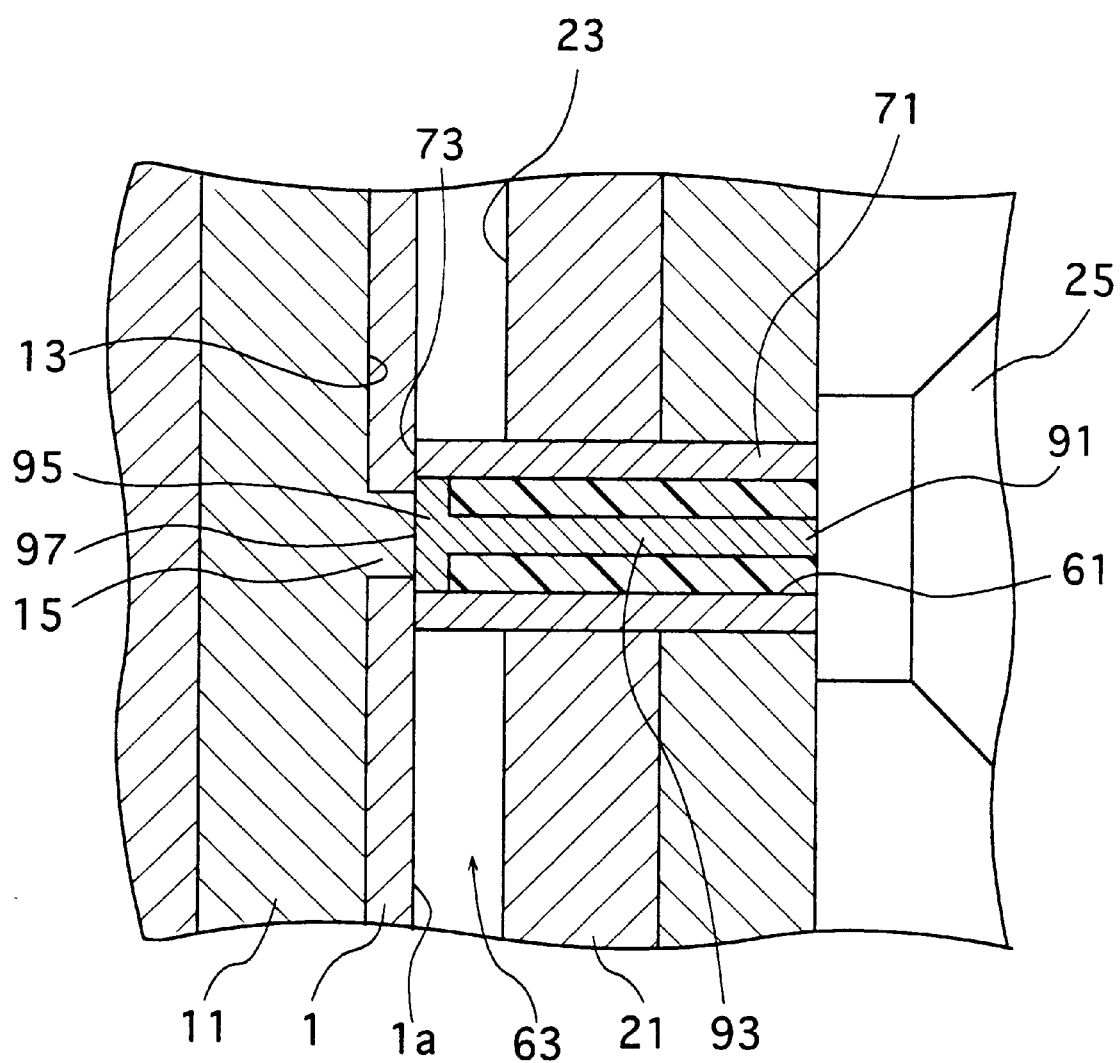
FIG. 11 is a sectional view of main parts of a mold for a disc manufacturing apparatus of a third embodiment of the present invention, showing a state after closing the mold and before injecting a resin.
Figure 12:
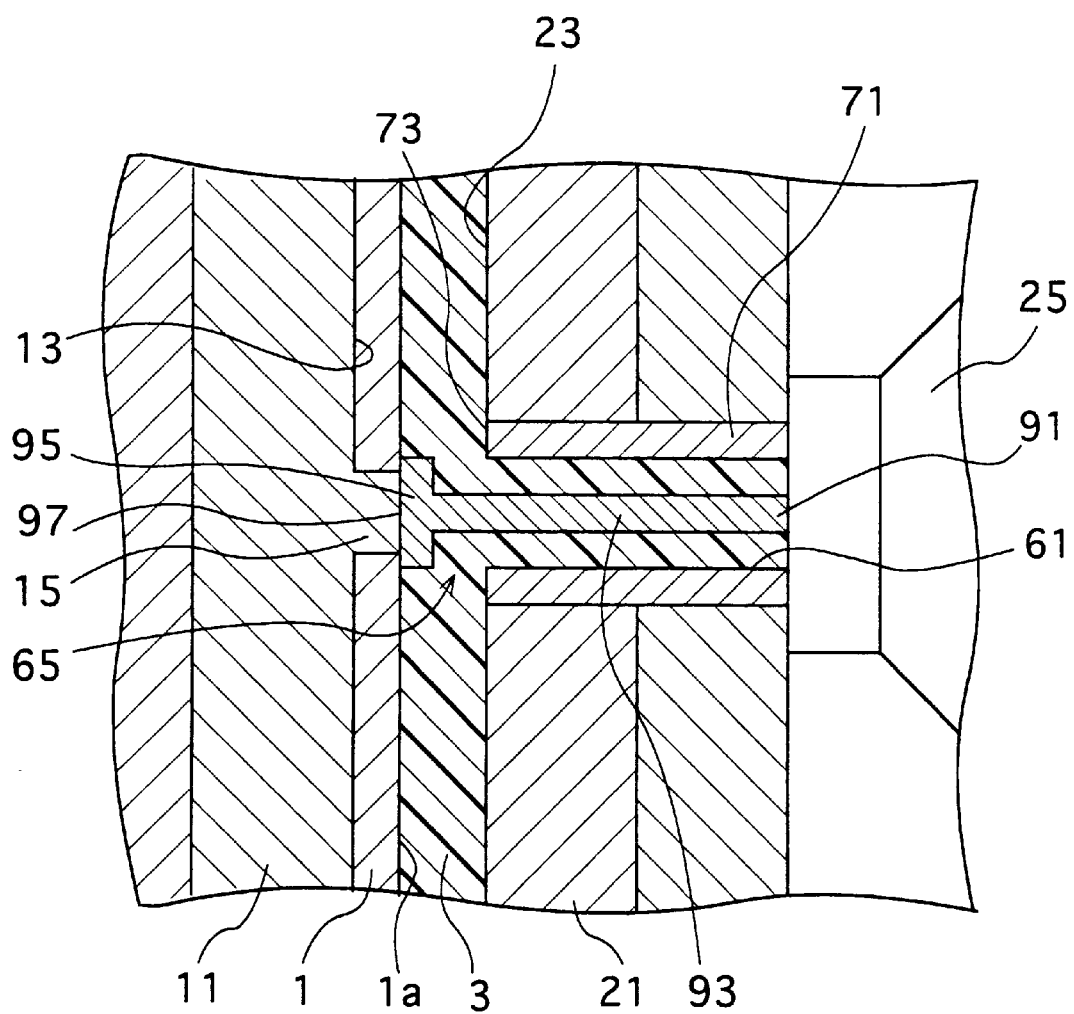
FIG. 12 is a sectional view of the main parts of the mold for the disc manufacturing apparatus of the third embodiment of the present invention, showing a state in which the resin is injected.

FIG. 11 is a sectional view showing main parts of a mold for a disc manufacturing apparatus of a third embodiment of the present invention and shows the state after closing the mold and before injecting a resin. FIG. 12 is a sectional view showing the main parts of the mold for the disc manufacturing apparatus of the third embodiment of the present invention and shows the state in which the resin is injected.

In the third embodiment, as shown in FIG. 11 and FIG. 12, the same guide tube 71 as that of the second embodiment is used. On the other hand, in the present embodiment, a valve body 95 provided on a top end of a valve part 81 is set to have a smaller diameter than that of the second embodiment. It has an outer peripheral surface contact closely and sealingly with the internal circumferential surface of the top end of the guide tube 71. Namely, the valve body 95 is a disc shape having the same diameter as the inside diameter of the guide tube 71. A top end surface, as one side surface, of the valve body 95 is a flat surface 97 of round shape having a little bigger diameter than that of the positioning protrusion 15 of the moving part 10. It touches closely and sealingly the center part of one side of the stamper 1 at the mold closing time. The guide tube 71 can reciprocate between a contacting position (FIG. 11) where the valve seat surface 73 contacts the outer circumferential surface of the valve body 95 and the center part of one side surface of the stamper 1 and a separating position (FIG. 12) where the valve seat surface 73 separates from the stamper 1 and the outer circumferential surface of the valve body 95 in the direction of its axis by means of the driving means 51. In addition, the diameter of the valve body 95 is set to be the same as the inside diameter of the guide tube 71, so that the outer circumferential edge of the valve seat surface 73 covers the valve body 95 from the outside completely. Thus, the guide tube 71 and the valve member 91 are unified at the contacting position so as to define a cylindrical tubular shape which has a top end blocked and has the same diameter as the outer diameter of the guide tube 71. The valve body 95 of the valve member 91 constitutes a resin injection gate 65 or a gate means, as a connecting point of the communicating hole 61 to the forming space 63, so as to open and close a top end of a communicating hole 61.

Moreover, the top end of the resin injection means constitutes a center hole defining means to define a center hole 5 of a replica disc 3. Specifically, the center hole defining means is defined by the outer circumferential surface of the top end of the guide tube 71 which contacts the outer circumferential surface of the valve body 95 by advancing into the center part of the forming space 63 at the mold closing time.

In the third embodiment, the replica disc 3 can be also manufactured by the same manufacturing process as that of the first embodiment. In addition, the valve body 95 in addition to the guide tube 71 can be formed into a simple disc shape like the second embodiment.

Figure 13:
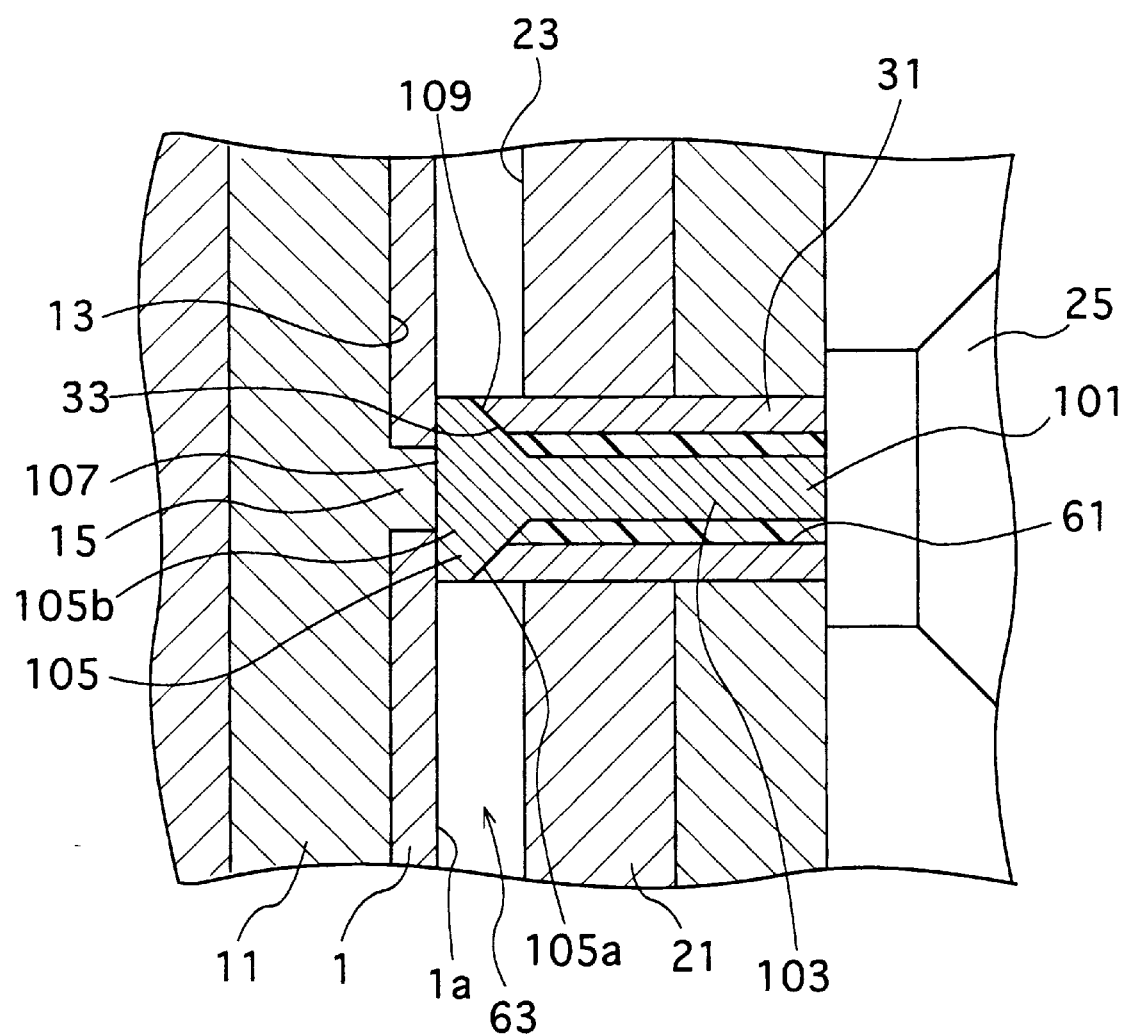
FIG. 13 is a sectional view showing main parts of a mold for a disc manufacturing apparatus of a fourth embodiment of the present invention.
Figure 15:
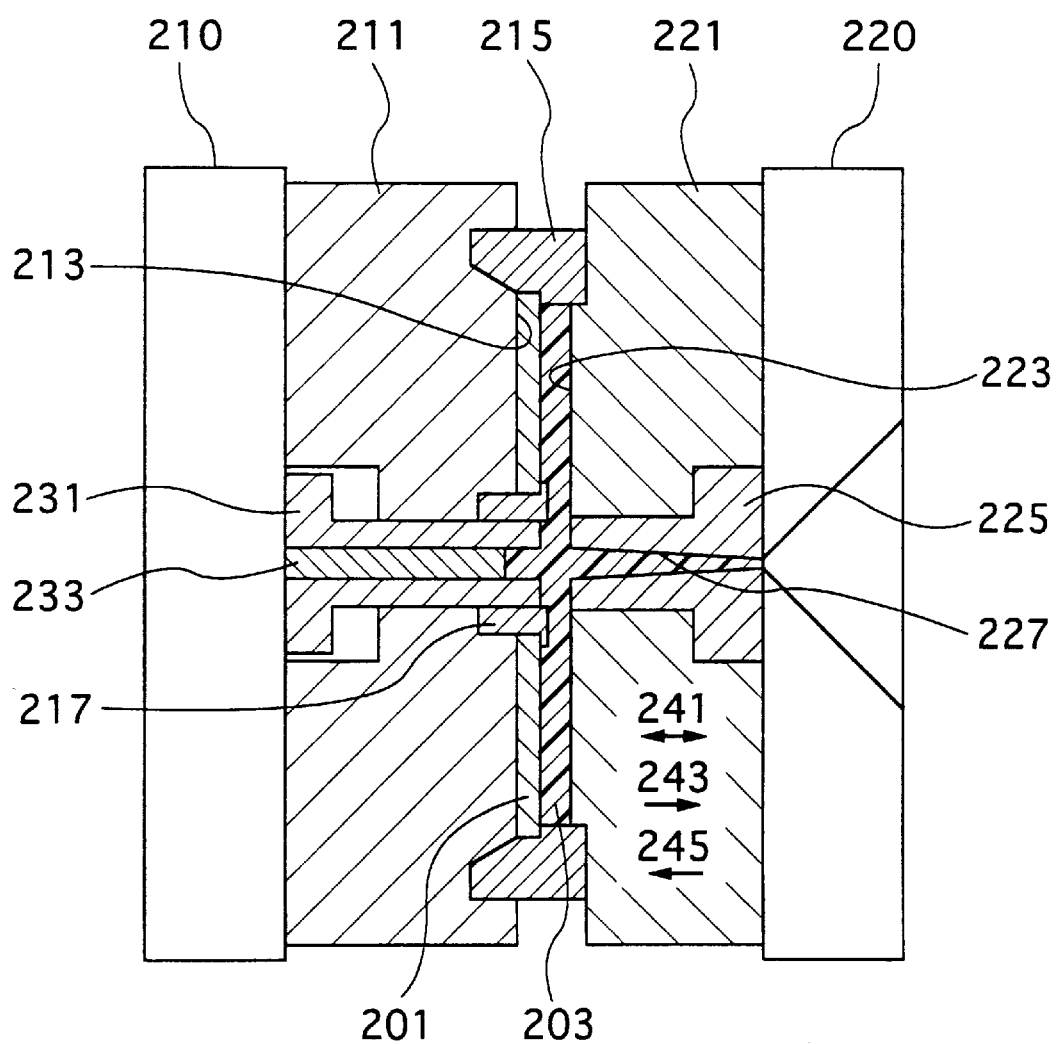
FIG. 15 is a sectional view showing a disc manufacturing apparatus in related art.
Figure 16:
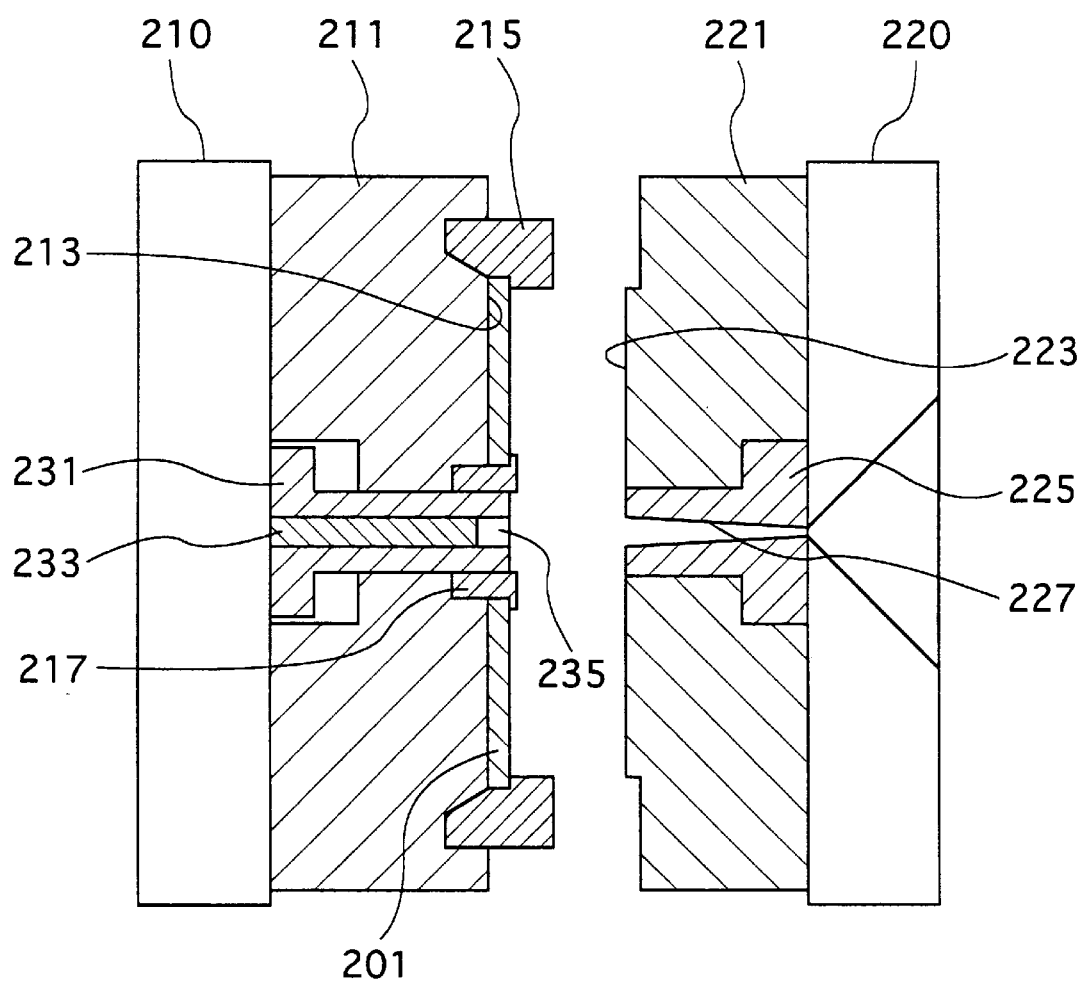
FIG. 16 is a sectional view showing a state in which a moving mold and a fixed mold are opened in a process for manufacturing a disc by the disc manufacturing apparatus of FIG. 15.

FIG. 13 is a sectional view showing main parts of a mold for a disc manufacturing apparatus of a fourth embodiment of the present invention.

This embodiment is different from the first embodiment in the shape of a valve body 105 provided on a top end of a valve member 101, which constitutes a resin injection means with a guide pipe 31. Namely, the valve member 101 is composed of a supporting bar 103 of cylindrical tubular shape and the valve body 105 formed integrally on the top end of the supporting bar 103. The valve body 105 is composed of a cone part 105a and a disc part 105b integrally formed on the top of the cone part 105a. The cone part has the same diameter as a diameter of the cone part 105a and the same shape as the valve body 45 of cone shape in the first embodiment. In addition, a top end surface, as one side surface, of the valve body 105 is a flat surface 107 of round shape having a larger diameter than that of the positioning protrusion 15 of the moving part 10. It touches closely and sealingly a center part of one side surface of the stamper 1 at the mold closing time.

A slanting surface of the cone part 105a, as the other side surface, of the valve body 105 is used as a sealing surface 109 which touches closely and planarly a valve seat surface 33 in a sealed state. The guide tube 31 can reciprocate between a contacting position (FIG. 13) where the valve seat surface 33 contacts the sealing surface 109 and a separating position where the valve seat surface 33 separates from the sealing surface 109 in the direction of its axis by means of the driving means 51. In addition, the diameter of the valve body 105 is set to be the same as the outside diameter of the guide tube 31, so that the outer circumferential edge of the valve seat surface 33 meets with the outer circumferential edge of the sealing surface 109 at the contacting position. Thus, the guide tube 31 and the valve member 101 are unified at the contacting position so as to define a cylindrical tubular shape which has a top end blocked and has the same diameter as the diameter of the guide tube 31. The valve body 105 of the valve member 101 constitutes a resin injection gate 65 or a gate means, as a connecting point of the communicating hole 61 to a molding space 63, so as to open and close a top end of the communicating hole 61.

Moreover, the top end of the resin injection means constitutes a center hole defining means to define a center hole 5 of a replica disc 3. Specifically, the center hole defining means is formed by the outer circumferential surface of the disc part 105b of the valve body 105 and the outer circumferential surface of the top end of the guide tube 31 which contacts the valve body 105 by advancing into the center part of the forming space 63 at the mold closing time.

In the fourth embodiment, the replica disc 3 can be also manufactured by the same manufacturing process as that of the first embodiment. The fourth embodiment has the same effects as the first embodiment. In addition, the valve body 105 is formed thicker owing to the cone part 105a and the disc part 105b, so that its strength is improved.

Next, an example of an optical disc manufactured by the above each embodiment is shown in FIG. 14.

FIG. 14 is a plan view showing an optical disc, manufactured by the disc manufacturing method according to the first embodiment of the present invention, provided with a center hole at its center and having an information recording area even near the center hole.

In FIG. 14, a cross-hatching area on a plane of an optical disc 110 is an information recording area 111 where data, recorded on a stamper 1, is transferred. Namely, it is a recording surface or a transferred surface. Data is recorded in the area 111 up to the inside diameter of 35 mm near a center hole 112. Namely, a lead-in 113 of the information recording area 111 exists at the inside diameter of 35 mm. The center hole 112 is provided near there and its inside diameter is set from 15 mm to 15.1 mm in case of a compact disc. Therefore, it is possible to bring the recording data close to the center hole 112 and to provide the recording area 111 up to the radius 7.5+αmm (α=accuracy margin+beam diameter). However, in case of using polycarbonate as a forming material which is used in many compact discs now, it has a high birefringence at the inside diameter of twenty-few millimeter and it is not proper for a base material of an optical disc. Therefore, it is possible to provide the information recording area 111 from the inside diameter of 30 mm. In the above embodiment, the recording area 111 is set to be provided from the inside diameter of 35 mm for the sake of room. In case of using polyolefine resins or PMMA resins and so on as a forming material, which have a low birefringence, it is possible to provide the information recording area 111 up to more inside.

Figure 18:
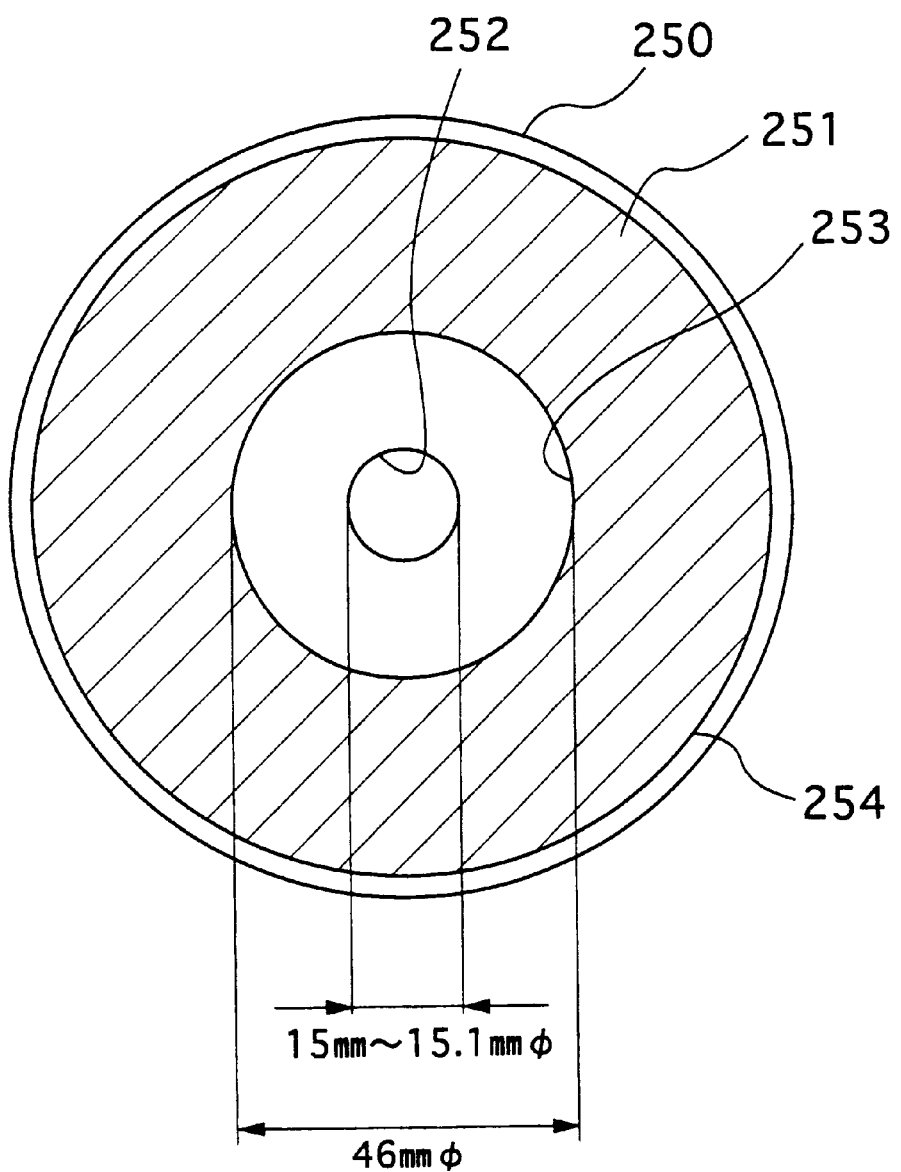
FIG. 18 is a plan view of a disc in related art.

Next, referring to FIG. 14 and FIG. 18, an increased part of a recording area on a replica disc 3 manufactured by an optical disc manufacturing apparatus and method in the above embodiment, which can provide an information recording area 111 even near its center, is described while compared with an optical disc in the related art.

In FIG. 18, in case of a compact disc in the related art whose diameter is 120±0.3 mm, regarding an information recording area 251 shown by the cross-hatching, a lead-in 253 as a recording start point is at the radius of 23 mm from the center and a lead-out 254 as a recording end position is at the radius of 58.5 mm from the center, on the basis of the standards of International Electrotechnical Commission (IEC 908;1987) and Japanese Industrial Standards (JIS S-8605-1993). Therefore, the area of the information recording area 251 is about 9089 mm$^2$. Compared with that, regarding the information recording area 111 in each embodiment of the present invention, it is possible to set the lead-in 113 at the radius of 17.5 mm from the center and the lead-out 114 at the radius of 58.5 mm from the center, as shown in FIG. 14. Therefore, the area of the information recording area 111 is about 9789 mm$^2$ and it is increased by about 8%, compared with that of a disc in the related art. It corresponds to the increase of one or two pieces of music and a recording area is enlarged further.

In case of a compact disc whose diameter is 80±0.3 mm, regarding the information recording area 251 in the related art, the lead-in 253 is at the radius of 23 mm from the center and the lead-out 254 is at the radius of 38 mm from the center. Therefore, the area of the information recording area 251 is about 2875 mm$^2$. Compared with that, regarding the information recording area 111 in each embodiment of the present invention, it is possible to set the lead-in 113 at the radius of 17.5 mm from the center and the lead-out 114 at the radius of 38 mm from the center. Therefore, the area of the information recording area 111 is about 3574 mm$^2$ and it is increased by about 24% compared with that of a disc in the related art.

It goes without saying that the above described ones can be applied to a disc whose diameter is 80±0.3 mm and 150±0.3 mm.

In addition, it goes without saying that a disc in the present invention can be applied to an optical disc only for reproducing, a write-once-type optical disc and a rewritable type optical disc like an magneto-optical disc and a phase change type optical disc.

The preferred embodiments described herein are therefore illustrative and not restrictive, the scope of the invention being indicated by the appended claims and all variations which come within the meaning of the claims are intended to be embraced therein.

What is claimed is:

1. An optical disc manufacturing apparatus comprising:
a first mold;
a stamper having a data transfer surface supported on an inside surface of said first mold;
a supporting means, provided on said first mold, for supporting said stamper;
a second mold opened and closed relatively to said first mold, a disc forming space defined between an inside surface of said second mold and said data transfer surface of said stamper supported on said inside surface of said first mold when said first and second molds are closed;
a resin injection means including a guide tube and a valve member;
said guide tube provided through said second mold;
said valve member provided in said guide tube so that a communication hole for a resin is defined between said guide tube and said valve member, said valve member having a valve body at a leading end of said valve member and a length a little longer than the distance between said data transfer surface of said stamper and said inside surface of said second mold when said first and second molds are closed;
said guide tube reciprocatable relative to said valve member between a first position and a second position, a leading end of said guide tube coming in close contact with said valve body in said first position, said leading end of said guide tube separating from said valve body in said second position;
said guide tube and said valve member moving together toward a center part of said data transfer surface of said stamper when closing said first and second molds, said guide tube being kept in said first position so as to shut off said communication hole, so that at least said valve body comes in close contact with said center part of said data transfer surface of said stamper and so that at least said guide tube defining a center hole of an optical disc by the outer periphery of said guide tube when resin is injected into said disk forming space, said guide tube moving to said second position while said at least said valve body is in close contact with said center part of said data transfer surface of said stamper so as to cause said resin to flow through said communication hole and fill said disc forming space; and
a damper mechanism provided on a base end of said valve member so that said valve body reciprocates elastically in a direction of its axis so as to touch closely and elastically said center part of said data transfer surface of said stamper when closing said first and second molds.

* * * * *